United States Patent
Jeon et al.

(10) Patent No.: US 11,317,455 B2
(45) Date of Patent: Apr. 26, 2022

(54) METHOD AND DEVICE FOR TRANSMITTING AND RECEIVING MEASUREMENT REPORT IN WIRELESS COMMUNICATION SYSTEM USING CARRIER AGGREGATION TECHNIQUE

(71) Applicant: Samsung Electronics Co., Ltd., Suwon-si (KR)

(72) Inventors: Namryul Jeon, Seoul (KR); Kwanhee Roh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/779,334

(22) PCT Filed: Dec. 9, 2016

(86) PCT No.: PCT/KR2016/014457
§ 371 (c)(1),
(2) Date: May 25, 2018

(87) PCT Pub. No.: WO2017/099525
PCT Pub. Date: Jun. 15, 2017

(65) Prior Publication Data
US 2018/0310354 A1   Oct. 25, 2018

(30) Foreign Application Priority Data
Dec. 10, 2015   (KR) .................. 10-2015-0176281

(51) Int. Cl.
*H04W 76/15*   (2018.01)
*H04W 16/24*   (2009.01)
(Continued)

(52) U.S. Cl.
CPC ........... *H04W 76/15* (2018.02); *H04W 16/24* (2013.01); *H04W 24/10* (2013.01); *H04W 88/02* (2013.01);
(Continued)

(58) Field of Classification Search
None
See application file for complete search history.

(56) References Cited

U.S. PATENT DOCUMENTS 5,822,686 A * 10/1998 Lundberg .............. H04W 24/10
455/161.3
10,070,426 B2   9/2018 Yang et al.
(Continued)

FOREIGN PATENT DOCUMENTS

CN   104080101 A   10/2014
WO   2014/021664 A1   2/2014
(Continued)

OTHER PUBLICATIONS

Ericsson et al.; Stage-3 details of serving cell reporting for CA; 3GPP TSG-RAN WG2#71bis; Tdoc R2-105531; Oct. 11-15, 2010; Xi'an, CN.
(Continued)

*Primary Examiner* — Faruk Hamza
*Assistant Examiner* — Cassandra L Decker
(74) *Attorney, Agent, or Firm* — Jefferson IP Law, LLP

(57) ABSTRACT

According to an embodiment of the present invention, a method by which a base station receives a measurement report in a wireless communication system using a carrier integration technique comprises the steps of: generating a cell list for a second cell according to whether the second cell to be added from a first cell belongs to the same cell group as the first cell; transmitting, to a terminal, a measurement report command including configuration informa-
(Continued)

tion related to the cell list; and receiving, from the terminal, a measurement report of the second cell on the basis of the configuration information, if the second cell belongs to the same cell group as the first cell.

14 Claims, 12 Drawing Sheets

(51) Int. Cl.
- *H04W 24/10* (2009.01)
- *H04W 88/02* (2009.01)
- *H04W 88/08* (2009.01)
- *H04W 76/27* (2018.01)

(52) U.S. Cl.
CPC ......... *H04W 88/023* (2013.01); *H04W 88/08* (2013.01); *H04W 76/27* (2018.02); *Y02D 30/70* (2020.08)

(56) References Cited

U.S. PATENT DOCUMENTS

| | | | |
|---|---|---|---|
| 2009/0047960 A1* | 2/2009 | Gunnarsson | H04J 11/0093 455/436 |
| 2010/0240358 A1 | 9/2010 | Jen et al. | |
| 2012/0250578 A1* | 10/2012 | Pani | H04W 48/12 370/254 |
| 2013/0010763 A1* | 1/2013 | Chen | H04L 5/001 370/331 |
| 2013/0163454 A1 | 6/2013 | Liang et al. | |
| 2013/0260741 A1* | 10/2013 | Yamada | H04L 1/0026 455/422.1 |
| 2013/0267221 A1 | 10/2013 | Srinivasan et al. | |
| 2014/0094168 A1* | 4/2014 | Aikawa | H04W 36/0061 455/434 |
| 2015/0055629 A1 | 2/2015 | Oh et al. | |
| 2015/0087315 A1 | 3/2015 | Lu et al. | |
| 2015/0189574 A1 | 7/2015 | Ng et al. | |
| 2015/0271715 A1 | 9/2015 | Ryu | |
| 2015/0350896 A1* | 12/2015 | Jeong | H04W 12/041 455/410 |
| 2015/0365857 A1 | 12/2015 | Wei et al. | |
| 2016/0192181 A1* | 6/2016 | Choi | H04B 7/26 455/422.1 |
| 2016/0234710 A1 | 8/2016 | Jung et al. | |
| 2016/0316386 A1* | 10/2016 | Futaki | H04B 17/382 |
| 2016/0330680 A1 | 11/2016 | Yi et al. | |
| 2017/0034709 A1* | 2/2017 | Hapsari | H04W 24/00 |
| 2018/0063736 A1* | 3/2018 | Sadeghi | H04W 24/10 |

FOREIGN PATENT DOCUMENTS

| | | |
|---|---|---|
| WO | 2014/110799 A1 | 7/2014 |
| WO | 2015/040521 A1 | 3/2015 |
| WO | 2015/041484 A1 | 3/2015 |
| WO | 2015/099495 A1 | 7/2015 |
| WO | 2015/105353 A1 | 7/2015 |

OTHER PUBLICATIONS

NSN et al.; RRM measurements for Dual Connectivity; 3GPP TSG-RAN WG2 Meeting #86; R2-142317; May 19-23, 2014; Seoul, KR.

Ericsson; White-list of cells for EUTRA measurement reporting; 3GPP TSG-WG2 Meeting #92; R2-156748; Nov. 16-20, 2015; Anaheim, CA.

Chinese Office Action with English translation dated 201680070518. X; Chinese Appln. No. dated Dec. 1, 2020.

\* cited by examiner

FIG. 7

| Index (=Ranking) | CIO Cell List ||| MR TRIGGERING FREQUENCY |
| --- | --- | --- | --- |
| | ECGI | PCID | |
| 1 | aaa | AAA | 12345 |
| 2 | bbb | BBB | 11111 |
| 3 | ccc | CCC | 3000 |
| ⋮ | ⋮ | ⋮ | |
| 32 | xxx | XXX | 11 |
| ⋮ | ⋮ | ⋮ | ⋮ |
| Max Size of (Scheduling Unit) | zzz | zzz | 2 |

FIG. 8

| Index (=Ranking) k | PCID c | AVERAGE SOJOURN TIME OUT OF MAXCELLS OBLc | NUMBER OF MRS OCCURRED OUT OF MAXCELLS Nc | SOJOURN TIME OUT OF MAXCELLS Oc |
|---|---|---|---|---|
| 1 | AAA | 12 | 12 | 0 |
| 2 | BBB | 20 | 20 | 0 |
| 3 | CCC | 23 | 9 | 0 |
| ... | ... | | | |
| MaxCells $k_0$ | XXX | 231 | 3 | 0 |
| MaxCells + 1 | GGG | 216 | 2 | 321 |
| MaxCells + 2 | TTT | 344 | 3 | 231 |
| ... | ... | | ... | |
| Kmax | - | - | - | - |

METHOD AND DEVICE FOR TRANSMITTING AND RECEIVING MEASUREMENT REPORT IN WIRELESS COMMUNICATION SYSTEM USING CARRIER AGGREGATION TECHNIQUE

TECHNICAL FIELD

The present invention relates to a method and device for transmitting and receiving a received power measurement report message in a wireless communication system supporting a carrier aggregation technique.

BACKGROUND ART

The mobile communication system has been developed for the user to communicate on the move. With the rapid advance of technologies, the mobile communication system has evolved to the level capable of providing high speed data communication services as well as a voice telephony service.

Recently, standardization for a Long Term Evolution (LTE) system, as one of the next-generation mobile communication systems, has been completed in the $3^{rd}$ Generation Partnership Project (3GPP), and standardization for LTE-Advanced is underway. LTE is a technology for realizing high-speed packet-based communications at the data rate of up to 100 Mbps, which is higher than the currently available data rate, and its standardization has been completed.

Recent studies are focused on the LTE-Advanced (LTE-A) for improving data rates with the application of various new techniques to the legacy LTE system. One of such technologies is carrier aggregation. Unlike the conventional technology of using one downlink carrier and one uplink carrier for data communication, carrier aggregation is a technology allowing a terminal to use multiple downlink carriers and multiple uplink carriers. In order to realize the carrier aggregation service, it is necessary for base stations as well as terminals to have carrier aggregation capability.

DISCLOSURE OF INVENTION

Technical Problem

The present invention aims to provide a method and device for transmitting and receiving a received signal power measurement report message that is capable of preventing a cell that is not able to be a secondary cell (SCell) from generating measurement report messages.

Solution to Problem

In accordance with an aspect of the present invention, a measurement report reception method of a base station in a wireless communication system supporting a carrier aggregation technique includes generating a cell list of second cells according to whether a second cell to be added in addition to a first cell belongs to a cell group containing the first cell; transmitting a measurement report command including configuration information related to the cell list to a terminal; and receiving, if it is determined that the second cell belongs to the cell group containing the first cell based on the configuration information, a measurement report for the second cell from the terminal.

Preferably, the first cell is a primary cell (PCell), and the second cell is a secondary cell (SCell).

Preferably, the cell list contains information on k cells (k is a natural number equal to or greater than 2 and equal to or less than 32). Preferably, the cell list is generated per measurement object on which the base station instructs the terminal to perform measurement, the measurement object being a frequency or a radio access technology (RAT).

Preferably, the cell list comprises a ranking index, an E-UTRAN cell global identifier (ECGI), a physical cell ID (PCID), and a measurement report-triggering frequency of the second cell; and the ranking index is configured based on the measurement report-triggering frequency of the second cell.

Preferably, the cell list contains information on a third cell that does not belong to the cell group containing the first cell. Preferably, the information related to the third cell comprises a ranking index of the third cell, a physical cell ID (PCID) of the third cell, an average sojourn time while the third cell is not contained in the cell list, a number of measurement reports while the third cell is not contained in the cell list, and a sojourn time while the third cell is not contained in the cell list; the average sojourn time is determined based on the number of measurement reports and the sojourn time, and the ranking index is set based on the average sojourn time.

In accordance with another aspect of the present invention, a measurement report transmission method of a terminal in a wireless communication system supporting a carrier aggregation technique includes receiving, from a base station, a measurement report command including configuration information related to a cell list generated by the base station according to whether a second cell to be added in addition to a first cell belongs to a cell group containing the first cell; performing, if it is determined that the second cell belongs to the cell group containing the first cell based on the configuration information, measurement on a signal from the second cell; and transmitting, to the base station, a measurement report for the second cell that is generated based on the measurement result.

Advantageous Effects of Invention

The method and device for transmitting and receiving a measurement report in a wireless communication system supporting a carrier aggregation technique according to an embodiment of the present invention is advantageous in terms of reducing power consumption and saving frequency-time resources by using a cell list generated by a base station for controlling SCells in a measurement configuration to prevent a cell that is not able to be an SCell from generating measurement reports.

BRIEF DESCRIPTION OF DRAWINGS

FIG. 7 is a diagram illustrating a CIO cell list according to a first embodiment of the present invention;

FIG. 8 is a diagram illustrating a black cell list according to a second embodiment of the present invention;

MODE FOR THE INVENTION

Figure 1:
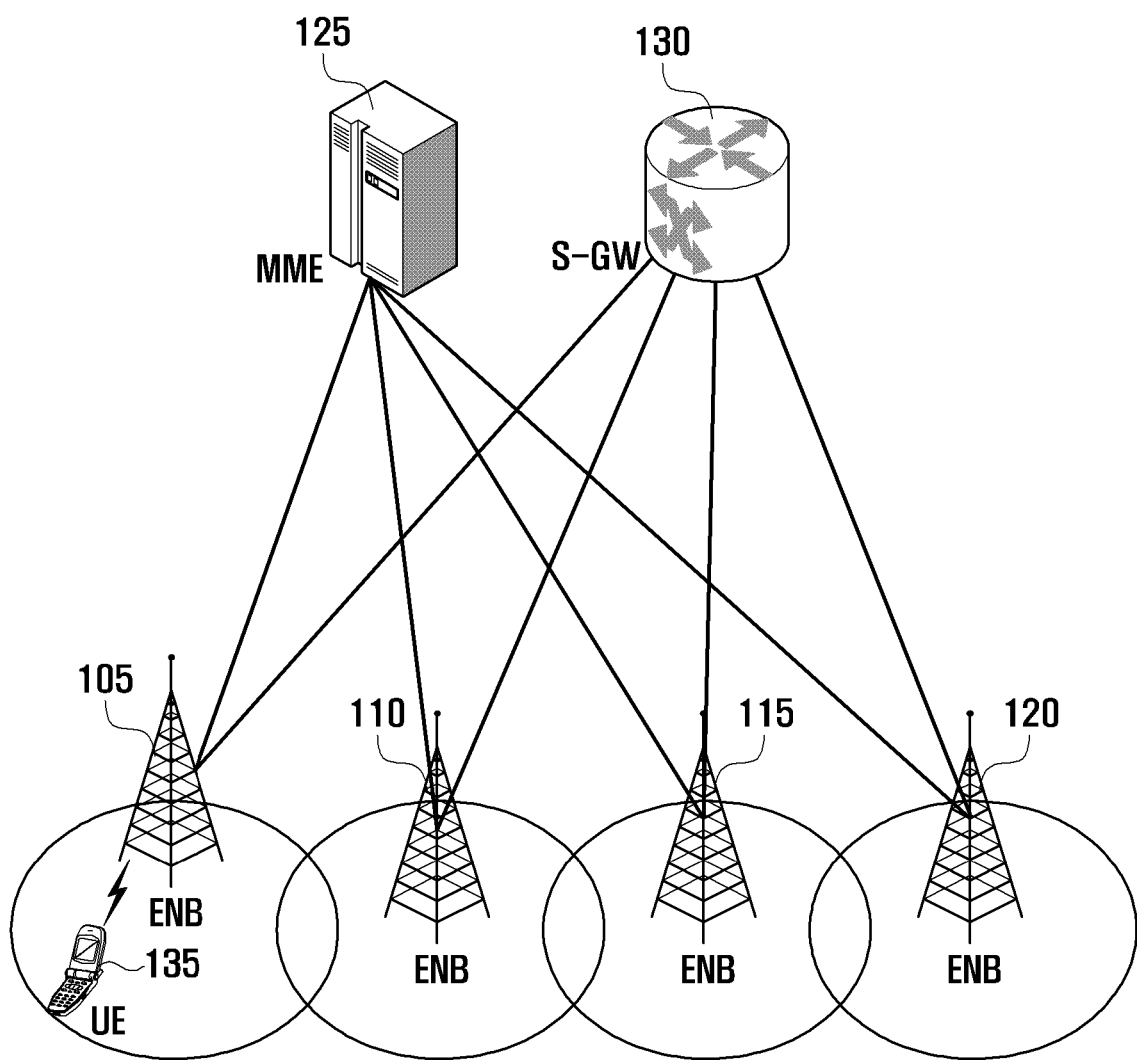
FIG. 1 is a diagram illustrating LTE system architecture to which the present invention is applied.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card. Before undertaking the detailed description of the present invention below, it may be advantageous to explain the LTE system and carrier aggregation.

FIG. 1 is a diagram illustrating LTE system architecture to which the present invention is applied.

In reference to FIG. 1, the radio communication system of the LTE system includes evolved Node Bs (eNBs) 105, 110, 115, and 120; a mobility management entity (MME) 125; and a serving gateway (S-GW) 130. The user equipment (UE) (or terminal) 135 connects to an external network via the eNBs 105, 110, 115, and 120 and the S-GW 130.

The eNBs 105, 110, 115, and 120 correspond to the legacy node Bs of the universal mobile telecommunications system (UMTS). The UE 135 connects to one of the eNBs via a radio channel, and the eNB has more complex functions than the legacy node B. In the LTE system where all user traffic including real time services such as voice over IP (VoIP) is served through shared channels, it is necessary to schedule UEs based on scheduling information such as buffer status, power headroom status, and channel status collected from the UEs, and an eNB serving the UEs takes charge of this function. Typically, one eNB hosts multiple cells. For example, the LTE system adopts orthogonal frequency division multiplexing (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 130 handles data bearer functions to establish and release data bearers under the control of the MME 125. The MME 125 handles various control functions for the UE as well as the mobile management function and has connections with the eNBs.

Figure 2:
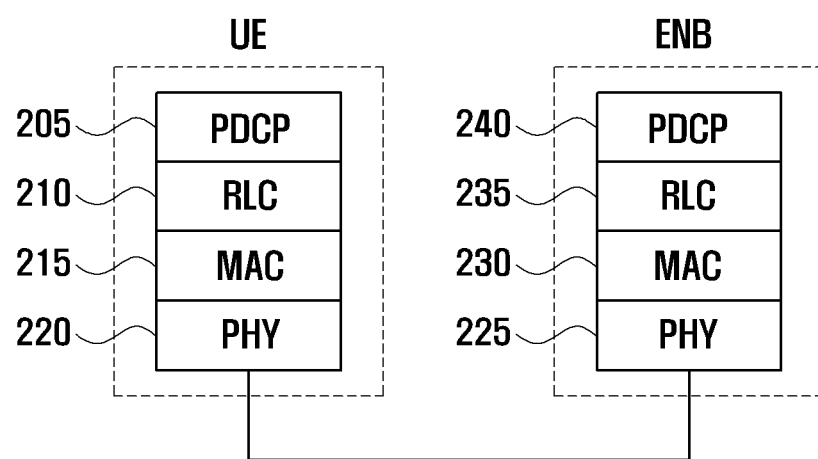
FIG. 2 is a diagram illustrating a protocol stack of an LTE system to which the present invention is applied.

FIG. 2 is a diagram illustrating a protocol stack of an LTE system to which the present invention is applied.

In reference to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP layer 205 and 240 takes charge of IP header compression/decompression, and the RLC layer 210 and 235 takes charge of reformatting PDCP Protocol Data Units (PDUs) into an appropriate size. The MAC layer 215 and 230 allows for connection of multiple RLC entities established for one UE and takes charge of multiplexing RLC PDUs from the RLC layer into a MAC PDU and demultiplexing a MAC PDU into RLC PDUs. The PHY layer 220 and 225 takes charge of channel-coding and modulation on higher layer data to generate and transmit OFDM symbols over a radio channel, and demodulating and channel-decoding on OFDM symbols received over the radio channel to deliver the decoded data to the higher layers. The PHY layer 120 and 125 uses Hybrid Automatic Repeat Request (HARQ) for additional error correction by transmitting 1-bit information indicating positive or negative acknowledgement about data packets, the acknowledgement being transmitted from the receiver to the transmitter. The 1-bit information is referred to as acknowledgement/negative acknowledgement (ACK/NACK). The downlink HARQ ACK/NACK corresponding to an uplink transmission may be transmitted in Physical Hybrid-ARQ Indicator Channel (PHICH), and the uplink HARQ ACK/NACK corresponding to a downlink transmission may be transmitted in Physical Uplink Control Channel (PUCCH) or Physical Uplink Shared Channel (PUSCH).

Figure 3:
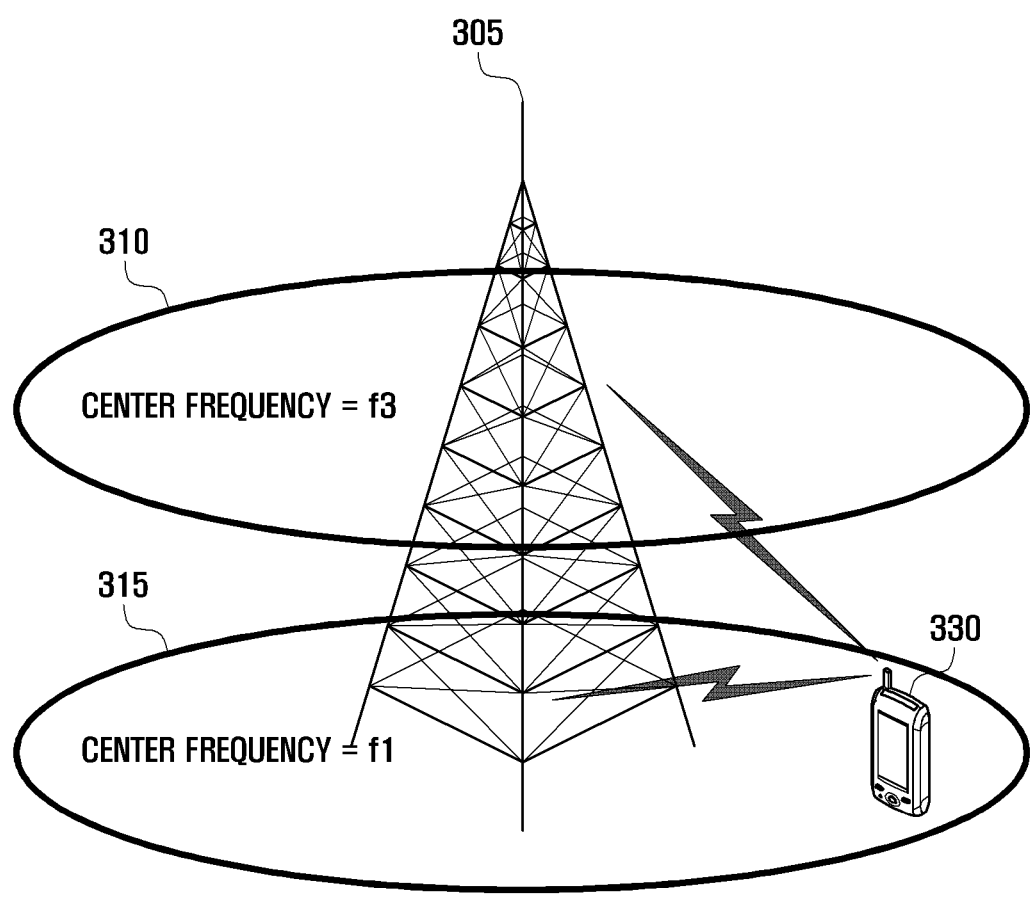
FIG. 3 is a diagram illustrating a concept of carrier aggregation for a UE.

FIG. 3 is a diagram illustrating a concept of carrier aggregation for a UE.

In reference to FIG. 3, an eNB transmits and receives signals through multiple carriers across a plurality of frequency bands. For example, when the eNB 305 is configured to use the downlink carrier 315 with center frequency f1 and the downlink carrier 310 with center frequency f3, the conventional UE receives data on one of the two carriers. However, the CA-enabled UE (or multi-frequency UE) is capable of transmitting/receiving data on multiple carriers simultaneously. The eNB 305 may allocate extra carriers to the CA-enabled UE 330 to increase a data rate of the UE 330 depending on the situation.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, the phrase "a UE receives data through a certain downlink carrier or transmits data through a certain uplink carrier" means to receive or transmit data through control and data channels provided in cells corresponding to center frequencies and frequency bands characterizing the carriers. Although the description is directed to an LTE system for convenience of explanation, the present invention can be applied to other types of wireless communication systems supporting carrier aggregation (CA).

In an LTE system, the CA technique is implemented in such way that a UE attaches to a PCell acting as an RRC-signaling anchor including security and then the PCell allocates extra frequency resources to add a SCell through additional RRC signaling.

In the LTE system, the CA technique allows for a new SCell to be configured or for change of an old SCell for a new SCell based on a measurement report.

In the case of configuring a new S Cell based on a received signal quality measurement report message, an eNB sends measurement configuration to instruct a UE to transmit a measurement report if a received signal electric field (reference signal received power (RSRP) or signal-to-noise-plus-interference (SINR)) of an SCell is equal to or greater than a predetermined level. If the frequency signal quality of the SCell fulfils the received signal electric field condition configured as above, the UE sends a measurement report message to the eNB (or PCell), which allocates an SCell fulfilling the received signal electric field condition including the measurement report message to the UE for the CA service.

In the case of changing an old SCell for a new SCell based on the measurement report, the eNB sends measurement configuration to instruct a UE, if the UE detects a neighboring cell of which an electric field is better than that of the current SCell configured to the UE, to transmit a measurement report to the eNB. Afterward, if the UE transmits a measurement report message to the eNB under this condition, the eNB releases the old SCell and allocates the SCell with the better electric field as indicated in the measurement report to the UE for the CA service.

However, a set of the cells eligible for being SCells in association with the PCell in a real LTE network is limited by the physical connection structure of the eNB and a performance restriction in processing traffic distribution from the PCell to SCells. That is, the PCell and SCells should belong to the same cell group in which the cells can share information with each other and transmit and exchange traffic with each other. If a PCell and a SCell belong to the same cell group, this may mean that the PCell and the SCell are hosted by identical or compatible digital signal processors (DSPs) channel cards or an eNB or are connected via an inter-cell traffic switch.

Figure 4:
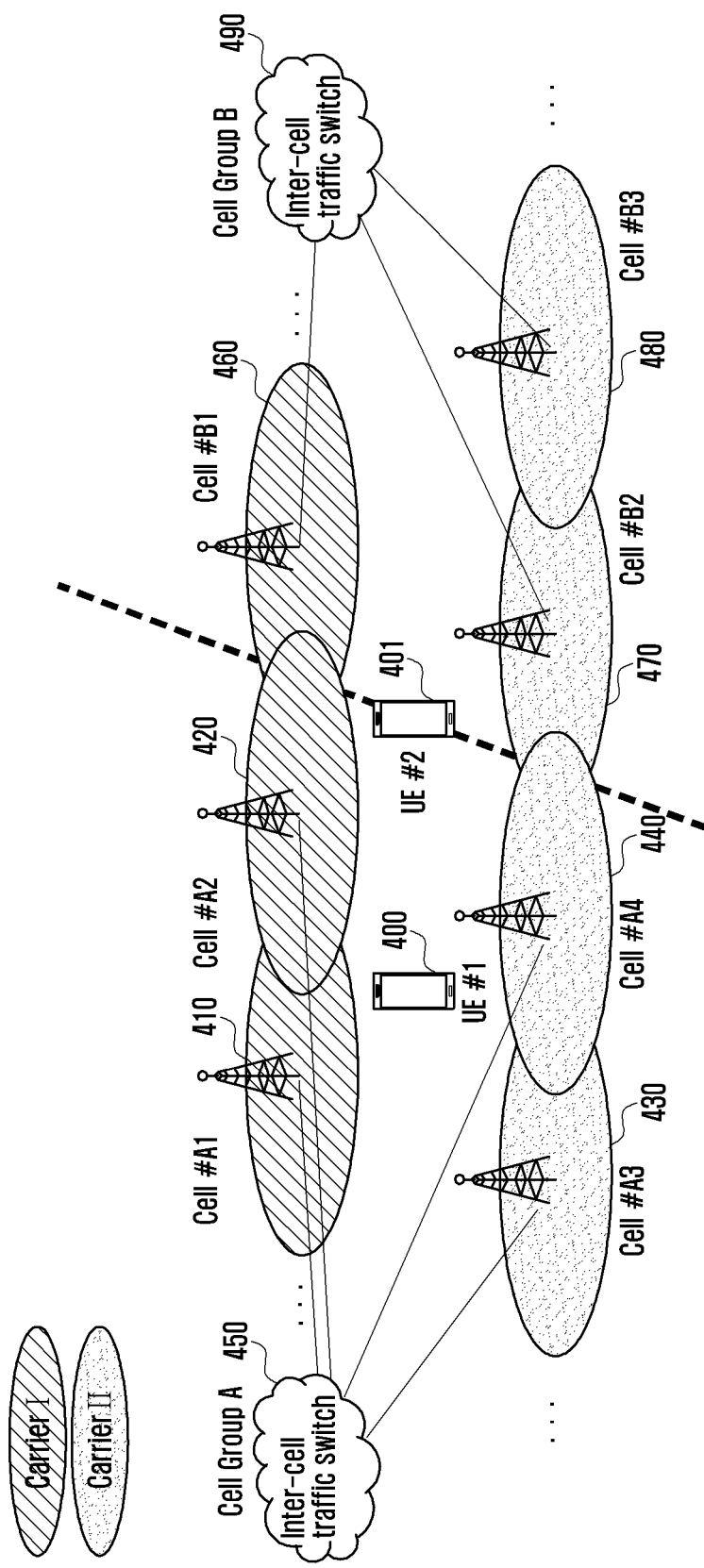
FIG. 4 is a diagram for explaining a wireless communication system supporting an inter-cell group CA technique.

FIG. 4 is a diagram for explaining a wireless communication system supporting an inter-cell group CA technique.

In reference to FIG. 4, the wireless communication system supporting the CA technique may include two cell groups (cell group A and cell group B) operating on two different component carriers. The first and second UEs 400 and 401 may be allocated various PCell-SCell combinations according to the contents of measurement reports.

Cell A1 410, cell A2 420, cell A3 430, and cell A4 440 that are connected via a first inter-cell traffic switch 450 belong to cell group A. Cell B1 460, cell B2 470, and cell B3 480 that are connected via a second inter-cell traffic switch 490 belong to cell group B.

TABLE 1

| Case # | Old PCell | Old SCell | Measurement Report result | Changed SCell |
|---|---|---|---|---|
| UE #1 | Cell #A1 | Cell #A3 | Cell #A4 is better than Cell #A3 | Cell #A4 |
| | Cell #A1 | Cell #A4 | Cell #A3 is better than Cell #A4 | Cell #A3 |
| | Cell #A4 | Cell #A1 | Cell #A2 is better than Cell #A1 | Cell #A2 |
| | Cell #A4 | Cell #A2 | Cell #A1 is better than Cell #A2 | Cell #A1 |

TABLE 1-continued

| Case # | Old PCell | Old SCell | Measurement Report result | Changed SCell |
|---|---|---|---|---|
| UE #2 | Cell #A2 | Cell #A4 | Cell #B2 is better than Cell #B1 | Non-changeable |
| | Cell #B2 | Cell #B1 | Cell #A2 is better than Cell #B1 | Non-changeable |

Table 1 shows SCell configurations based on the measurement reports from the first and second UEs. In reference to Table. 1, if the first UE 400 configured with the cell A1 410 as its PCell receives a measurement report message indicating that the received signal electric field of the cell A4 440 is better than that of the cell A3 430, the first UE 400 may change its SCell from the cell A3 430 to the cell A4 440 based on the measurement report. The first terminal 400 can change its SCell from the cell A3 430 to the cell A4 440 because both the cell A3 430 and the cell A4 440 belong to the cell group A.

For example, if the second UE 401 configured with the cell A2 420 as its PCell receives a measurement report message indicating that the received signal electric field of the cell B2 470 is better than that of the cell A4 440, the second UE 401 cannot change its SCell from the cell B2 470 to the cell A4 440 based on the measurement report. Here, the second terminal 401 cannot change its SCell from the cell B2 470 to the cell A4 440 because the cell B2 470 and the cell A4 440 belong to different cell groups (cell group B and cell group A).

That is, although a cell belonging to a cell group not containing the PCell has the electric field better than that of the current SCell, the second UE 401 cannot change its SCell because of hardware restrictions.

Although Table 1 exemplifies the cases of changing an old SCell for a new SCell based on the measurement report message, this principle may be applied in the same manner to the case of configuring a new SCell based on the measurement report message. That is, in the case of configuring a new SCell based on the measurement report message, the UE cannot configure a cell belonging to a cell group not containing its PCell as its SCell, even though the cell has a good electric field, because of hardware restrictions.

Accordingly, if the UE selects a cell as an SCell based on only the electric field condition in ignorance of the information on the SCells belonging to the cell group containing its PCell, it may be likely to transmit a measurement report message recommending a cell belonging to a cell group not containing its PCell, resulting in transmission and reception resource waste. As the number of cells belonging to the cell group containing the PCell of the UE becomes smaller, the probability increases of generating a measurement report recommending a cell belonging to a cell group not containing the PCell of the UE.

Figure 5:
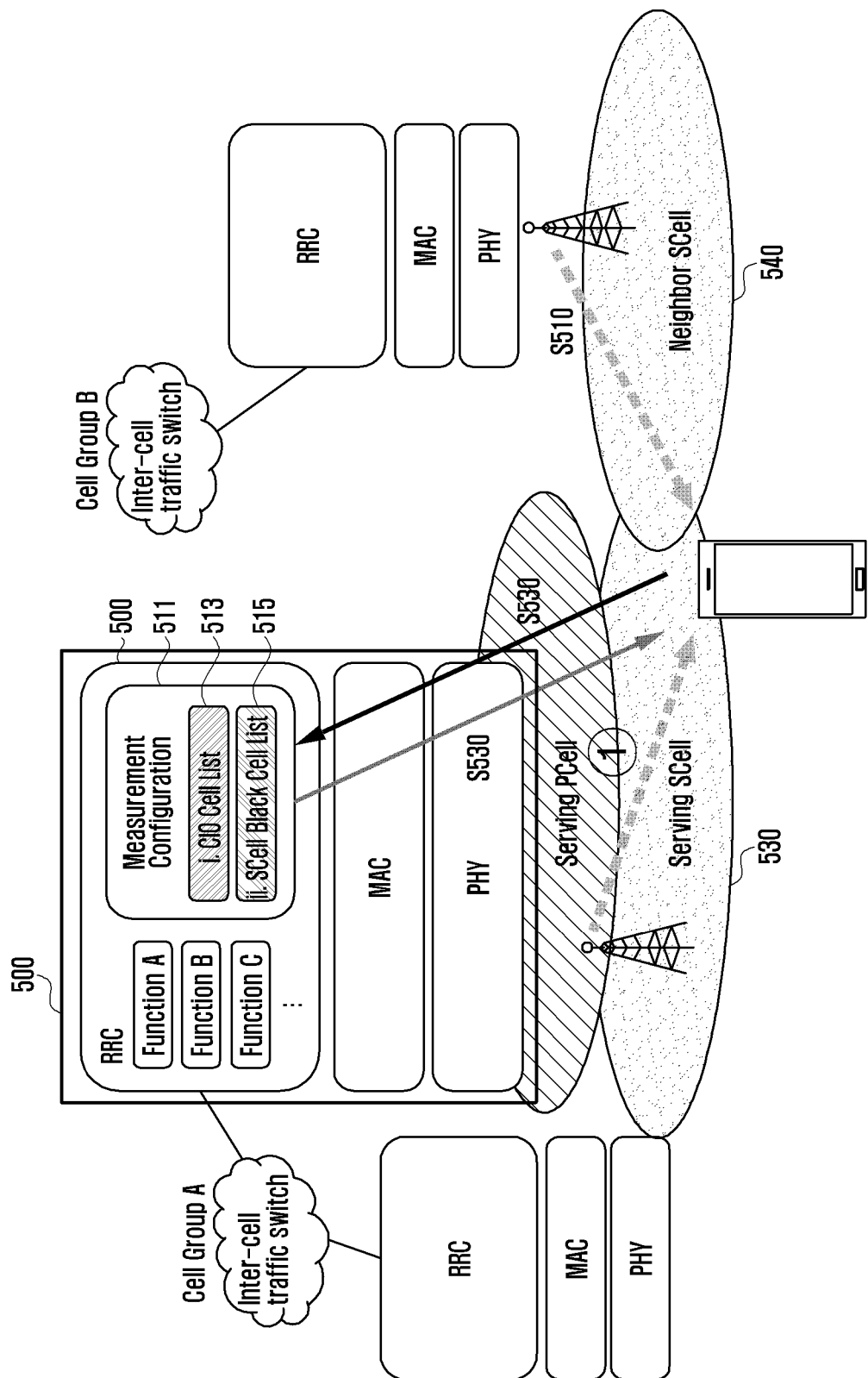
FIG. 5 is a diagram for explaining an SCell measurement report reception method of an eNB according to an embodiment of the present invention.

FIG. 5 is a diagram for explaining a SCell measurement report reception method of an eNB according to an embodiment of the present invention.

In reference to FIG. 5, a serving SCell 530 in an active state may transmit a first signal including a cell-specific reference signal (CRS) to a UE1 550 through a physical channel at step S500. A neighboring SCell 540 in the active state may transmit a second signal to the UE 550 including a CRS through a physical channel at step S510.

An eNB 500 may instruct, at step S530, the UE 550 to transmit a measurement report message to the eNB 500 if the received signal power of the CRS (or SINR) fulfils a predetermined condition (event-triggering condition). The instruction may be referred to as a received signal quality measurement configuration, which is conveyed in an RRC Connection Reconfiguration message.

In association with a serving PCell 520, a measurement configuration block 511 situated on the RRC layer of the eNB 500 may include a cell individual offset (CIO) cell list management block 513 and an SCell black list management block 515. According to various embodiments, the measurement configuration block 511 may include one of the CIO cell list management block 513 and the SCell black list management block 515.

When the eNB 500 configures measurement, the measurement configuration block 511 may control to transmit the measurement reports about the cells belonging to the cell group containing the PCell but not to transmit the measurement reports about the cells belonging to the cell group not containing the PCell.

The present invention proposes two types of measurement configuration methods. The eNB 500 may configure measurement by means of at least one of the CIO cell list management block 513 and the SCell black list management block 515.

On the basis of the measurement configuration by the eNB 500, the UE 550 may transmit a measurement report to the eNB 500 at step S540 if the CRS power or SINR of the serving SCell 530 or the neighboring SCell 540 fulfils a predetermined condition; the eNB 500 may execute a predetermined function based on the measurement report.

Figure 6:
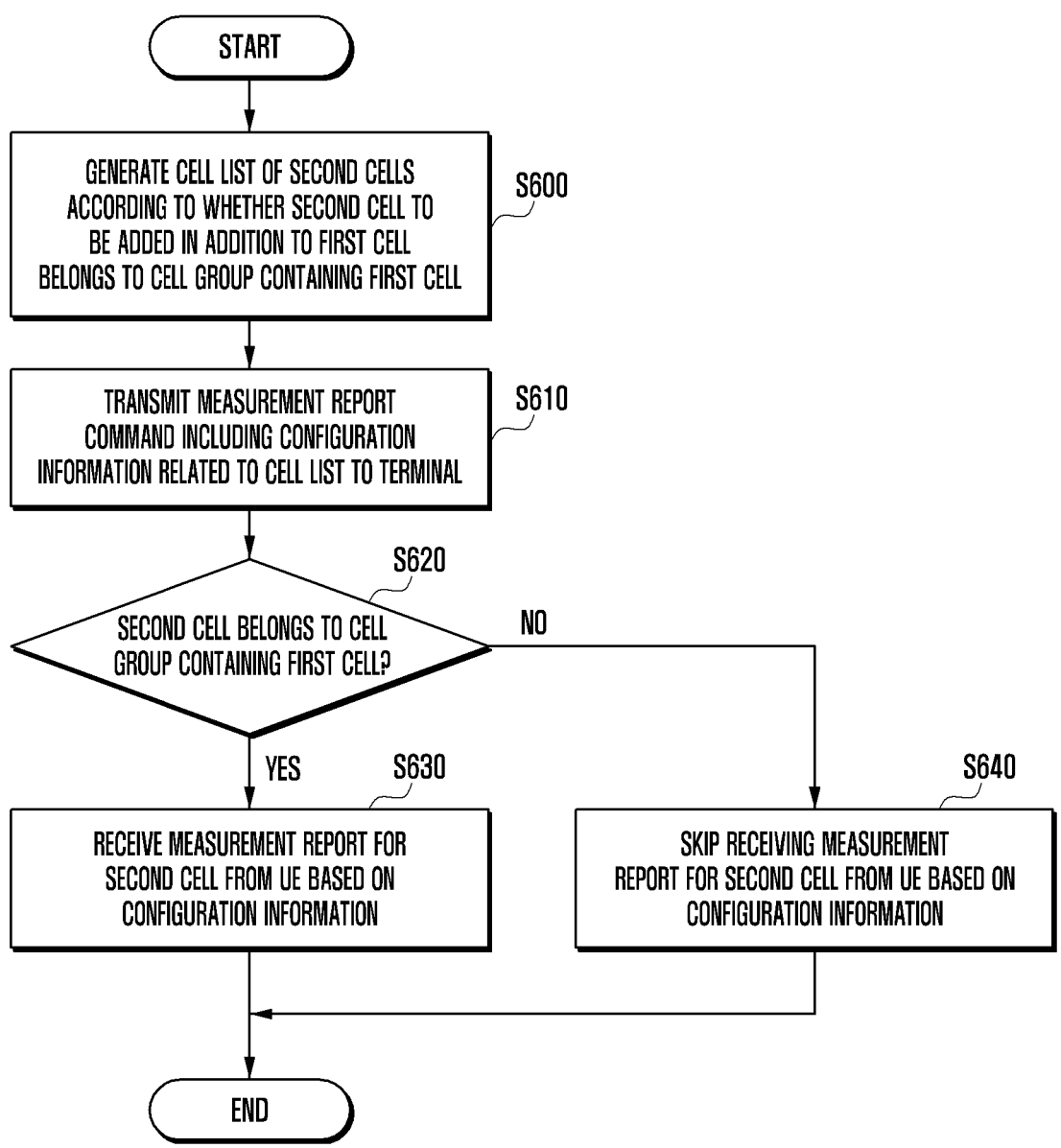
FIG. 6 is a flowchart for explaining an SCell measurement report reception method of an eNB according to an embodiment of the present invention.

FIG. 6 is a flowchart for explain a SCell measurement report reception method of an eNB according to an embodiment of the present invention.

In reference to FIG. 6, the eNB may generate, at step S600, a cell list of second cells according to whether a second cell to be added in addition to a first cell belongs to a cell group containing the first cell. The eNB may transmit a measurement report command including configuration information related to the cell list to the UE at step S610.

The eNB may determine at step S620 whether the second cell belongs to the cell group containing the first cell; receive, at step S630, a measurement report about the second cell that the UE generates based on the configured information for the case where the second cell belongs to the cell group containing the first cell; and skip, at step S640, receiving a measurement report about the second cell, on the basis of the configured information, for the case where the second cell does not belong to the cell group containing the first cell.

Here, the first cell is a primary cell (PCell), and the second cell is a secondary cell (SCell).

According to an embodiment of the present invention, the cell list may contain the information on k cells (here, k is a natural number equal to or greater than 2 and equal to or less than 32). The cell list may be generated per measurement object, which the eNB has instructed the UE to measure, and the measurement object may be a frequency or a radio access technology (RAT).

In the 3GPP standards, it is possible to configure the cell information of up to MaxCells (=32) in the cell list containing CIO per measurement object (MO) during the measurement configuration. Here, the MO means the frequency or RAT that the eNB has instructed the UE to perform measurement thereon.

The eNB may pre-register each cell with a cell group according to the operator's settings or recognize a hardware connection structure autonomously to generate a cell group.

In reference to 3GPP TS 36.331, an eNB may configure Event A4 for triggering a SCell addition operation and Event A6 for triggering a SCell change operation. The eNB may transmit an RRC message to instruct the UE to transmit a measurement report message if an entering condition of the events is met. The eNB may configure the event conditions as follows.

1. MO configuration for triggering SCell addition operation (Event A4)

$$Mn+Ofn+Ocn-\text{Hys}>\text{Thresh} \quad \text{[Equation 1]}$$

In the 3GPP TS 36.331, the entering condition for Event A4 is satisfied when the condition of Inequality 1 is fulfilled. Here, Mn denotes the measurement result of the neighboring cell, not taking into account any offsets; Ofn denotes the frequency specific offset of the frequency of the neighboring cell; Ocn denotes the cell-specific offset of the neighboring cell; Hys denotes the hysteresis parameter for this event; and Thresh denotes the threshold parameter for this event.

Here, Mn is expressed in dBm in case of reference signal received power (RSRP) or dB in case of reference signal received quality (RSRQ). Ofn, Ocn, and Hys are expressed in dB, and Thresh is expressed in the same unit as Mn.

In the present invention, the Event A4 measurement configuration for triggering the SCell addition operation may be performed with Equation 2 and Equation 3.

$$\text{Thresh\_new}=\text{Thresh}+\text{Offset-gap} \quad \text{[Equation 2]}$$

$$Ocn\_\text{new}=Ocn+\text{Offset-gap} \quad \text{[Equation 3]}$$

In the present invention, the default Thresh is increased as much as by Offset-gap as shown in Equation 2, and the Ocn as the CIO value is increased as much as by Offset-gap only for the cells belonging to the cell group containing the PCell so as to be able to become SCells as shown in Equation 3. That is, the event is triggered under the same electric field condition as before for the cells belonging to the cell group containing the PCell so as to be able to become SCells, while the entry condition of the event becomes as more difficult as by Offset-gap for the cells belonging to the cell group not containing the PCell so as not to be able to become SCells.

The eNB may configure the MO for triggering an SCell addition operation such that a first offset is added to the threshold value for triggering the SCell addition operation to protect against transmission of a measurement report for a third cell that does not belong to the cell group containing the first cell and a second offset is added to the cell-specific offset for the second cells to transmit a measurement report for the second cells belonging to the cell group containing the first cell. Here, the first cell is the primary cell and the second and third cells are SCells.

2. MO configuration for triggering SCell change operation (Event A6)

$$Mn+Ocn-\text{Hys}>Ms+Ocs+\text{Off} \quad \text{[Equation 4]}$$

In the 3GPP TS 36.331, the entry condition for Event A6 is satisfied when the condition of Equation 4 is fulfilled. Here, Mn denotes the measurement result of the neighboring cell, not taking into account any offsets; Ocn denotes the cell-specific offset of the neighboring cell; Hys denotes the hysteresis parameter for this event; Ms denotes the measurement result of the serving cell; Ocs denotes the cell-specific offset of the serving cell; and Off denotes the offset parameter for this event.

Here, Mn and Ms are expressed in dBm in case of RSRP or in dB in case of RSRQ. Ocs, Ocn, Hys, and Off are expressed in dB.

In the present invention, the Event A6 measurement configuration for triggering the SCell change operation may be performed with Equation 5 and Equation 6.

$$\text{Off\_new}=\text{Off}+\text{Offset-gap} \quad \text{[Equation 5]}$$

$$Ocn\_\text{new}=Ocn+\text{Offset-gap} \quad \text{[Equation 6]}$$

In the present invention, the default Off is increased as much as by Offset gap as shown in Equation 5, and the Ocn as the CIO value is increased as much as by Offset-gap only for the cell belonging to the cell group containing the PCell so as to be able to become SCells as shown in Equation 6. That is, the event is triggered under the same electric field condition as before for the cells belonging to the cell group containing the PCell so as to be able to become SCells, while the entry condition of the event becomes as more difficult as by Offset-gap for the cells belonging to the cell group not containing the PCell so as not to be able to become SCells.

The eNB may configure the MO for triggering an SCell change operation such that a third offset is added to the threshold value for triggering the SCell change operation to protect against transmission of a measurement report for a third cell that does not belong to the cell group containing the first cell and a fourth offset is added to the cell-specific offset for the second cells to transmit a measurement report for the second cells belonging to the cell group containing the first cell. Here, the first cell is the primary cell, and the second and third cells are SCells.

According to the 3GPP LTE standard, it is possible to configure up to 32 CIO values that have a role of adjusting per-cell entry barriers. In the present invention, it is possible to adjust the barrier of the event-trigger condition in the CA mode by applying different values of Ocn as a CIO value for the cells that can be configured or not configured as SCells as described above.

In the case where the number of cells of a cell group is greater than MaxCells, indicating the maximum number of cells in CellsToAddModList configurable by a UE per MO, as specified in the LTE standard, if there is a measurement report for a cell that is not included in the CIO cell list, it may be possible to select a cell for which a measurement report is least frequently received among MaxCells SCells in the CIO cell list and change the cell for which measurement report is received for this cell.

FIG. 7 is a diagram illustrating a CIO cell list according to a first embodiment of the present invention.

In reference to FIG. 7, the CIO cell list may include cell-specific ranking index, E-UTRAN cell global identifier (ECGI), physical cell ID (PCID), and measurement report triggering frequency. The ranking index may be set based on the measurement report triggering frequency of the second cell.

The CIO cell list is administrated as follows.

If a cell becomes available for use, the eNB includes all cells belonging to the cell group containing the corresponding cell in the CIO cell list per frequency. If an Event A4 measurement report triggering the SCell addition operation or Event A6 measurement report triggering the SCell change operation for a cell is received, the eNB increases the measurement report triggering frequency of the cell.

The cells contained in the CIO cell list are always arranged in a descending order of the measurement report triggering frequency (or MR-triggering frequency). That is, the cells contained in the CIO cell list are rearranged in the descending order whenever the measurement report triggering frequency rankings of the cells are changed.

At a timing when measurement configuration to a CA-capable UE is required on a new secondary component carrier (SCC), MaxCells cells with low ranking indices (i.e., high rankings) in the CIO cell list are included in the CellsToAddModList of the MO.

The CIO values of the cells contained in the CellsToAddModList determined through the above operation are set according to the SCell addition operation trigger condition and SCell change operation trigger condition. In the case of changing the SCell addition operation trigger condition, the Ocn value is increased by Offset-gap as shown in Equation 3, and the Thresh value is increased by Offset-gap as shown in Equation 2. In the case of changing the SCell change operation trigger condition, the Ocn value is increased by the Offset-gap as shown in equation 6, and the Off value is increased by the Offset-gap as shown in Equation 5.

At the timing when other preferential functions such as inter-frequency handover and inter-frequency mobility load balancing are initiated, however, the CIO cell list should be released, and the MO configuration of the UE should be replaced by an MO configuration for the corresponding functions.

FIG. 8 is a diagram illustrating a black cell list according to a second embodiment of the present invention.

During the MO configuration of a UE, the black cell list may be generated with cell information of up to MaxCells cells (=32). The eNB may administrate a black cell list for CA per cell that can be added as SCell on the SCC.

Upon receipt of an Event A4/A6 measurement report message for triggering SCell addition/change, if the cell that triggered the measurement report transmission does not belong to the cell group containing the PCell, the eNB adds the information on the cell to the black cell list. The cell information added to the black cell list is included in MO during the measurement configuration for triggering SCell addition/change.

In reference to FIG. 8, the black cell list may include the information related to the cells that do not belong to the sell group containing the PCell. The related information may include per-cell ranking index (k), per-cell physical ID (PCID, c), average sojourn time while the cell is not included in the black cell list (OBLc), number of measurement reports while the cell is not included in the black cell list (Nc), and sojourn time while the cell is not included in the black cell list (Oc); the average sojourn time (OBLc) may be determined based on the number of measurement reports (Nc) and the sojourn time (Oc); the ranking index (k) may be determined based on the ranking index (k) and the average sojourn time (OBLc).

As the average sojourn time (OBLc) of a cell, while the cell is not included in the black cell list, decreases, the ranking index (k) of the corresponding cell increases. In contrast, as the number of measurement reports (Nc), while the cell is not included in the black cell list, increases, the ranking index (k) of the corresponding cell decreases (i.e., higher ranking).

Figure 9:
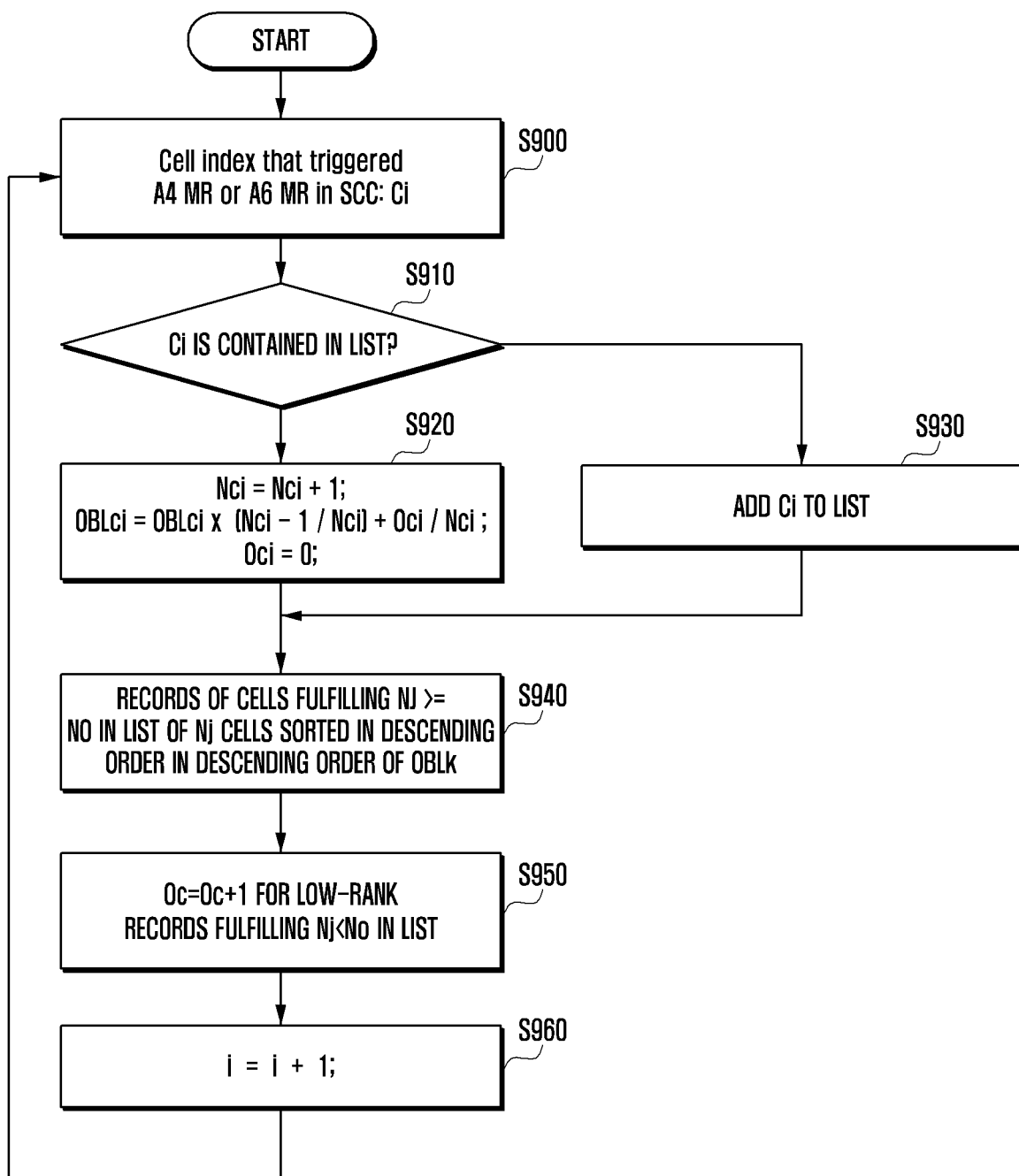
FIG. 9 is a flowchart illustrating a black cell list administration method according to the second embodiment of the present invention.

FIG. 9 is a flowchart illustrating a black cell list administration method according to a second embodiment of the present invention.

At step S900, an eNB may receive one of an Event A4 measurement report message for triggering a SCell addition operation or an Event A6 measurement report message for triggering a SCell change operation. Here, Ci is a cell index of a cell that has triggered the measurement report.

The eNB may determine at step S910 whether the cell index (Ci) of the cell that triggered the measurement report is included in the black cell list and perform an operation of step S920 or S930 according to the determination result.

If it is determined that the cell index (Ci) of the cell that triggered the measurement report is included in the black cell list, the eNB may perform the operation of step S920 with Equations 7.

$$Nci=Nci+1;$$

$$OBLci=OBLci*(Nci-1/Nci)+Oci/Nci;$$

$$Oci=0;  \qquad [\text{Equations 7}]$$

In Equations 7, Nci denotes the number of measurement reports while the cell with the cell index (Ci) is not included in the black cell list, OBLci denotes the average sojourn time while the corresponding cell is not included in the black cell list, and Oci denotes the $i^{th}$ sojourn time while the corresponding cell is not included in the black cell list.

If it is determined that the cell index (Ci) of the cell that triggered the measurement report is included in the black list, the eNB may increase the Nci for the cell with the cell index (Ci) by 1 and initialize the Oci to 0 in the black cell list to calculate the OBLci.

If it is determined that the cell index (Ci) of the cell that triggered the measurement report is not included in the black cell list, the eNB may add, at step S930, the cell triggered the measurement report to the black cell list. Here, the cell index (Ci) is added as the last record of the black cell list along with the information corresponding to the cell index (Ci), as shown in FIG. 8.

At step S940, the eNB may arrange the cells in the black cell list in a descending order of the number of measurement reports (Nj) while the cells are not included in the black cell list. The eNB may arrange, at step S940, the high-ranked records (or high indices) for the cells of which the number of measurement reports (Nj) is equal to or greater than a preconfigured value (No) in a descending order of the average sojourn time (OBLk) while the corresponding cells are not included in the black cell list.

At step S950, the eNB may increase the sojourn time (Oc) of the cells of which the numbers of measurement reports (Nj), while the cells are not included in the black cell list, are equal to or less than a preconfigured value (No), as the low-ranked records (or low indices), by 1.

Finally, the eNB may increase, at step S960, the event index (i) indicating the occurrence of the event.

Figure 10:
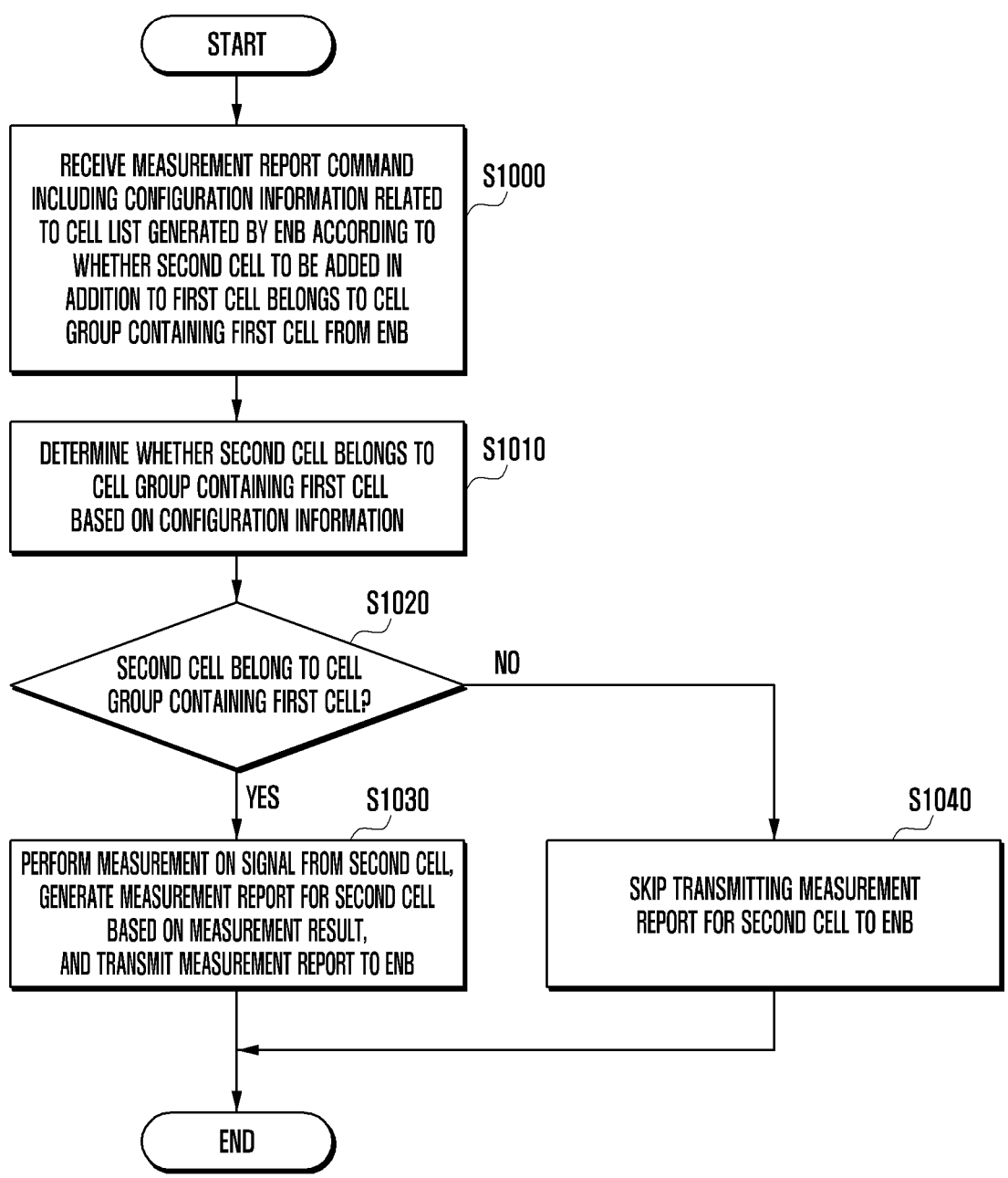
FIG. 10 is a flowchart for explaining a measurement report transmission method of a UE according to an embodiment of the present invention.

FIG. 10 is a flowchart for explaining a measurement report transmission method of a UE according to an embodiment of the present invention.

In reference to FIG. 10, a UE may receive, at step S1000, a measurement report command including configuration information related to a cell list generated by an eNB according to whether a second cell to be added in addition to the first cell belongs to a cell group containing the first cell.

At step S1010, the UE may determine whether the second cell belongs to the cell group containing the first cell based on the configuration information.

If it is determined at step S1020 that the second cell belongs to the cell group containing the first cell, eNB may perform measurement on the signal from the second cell and transmit a second cell measurement report generated based on the measurement result to the eNB at step S1030.

If it is determined at step S1020 that the second cell does not belong to the cell group containing the first cell, the eNB may not transmit the second cell measurement report to the eNB at step S1040.

Here, the first cell is a PCell, and the second cell is a SCell.

According to an embodiment of the present invention, the cell list may include the information on k cells (here, k is a natural number equal to or greater than 2 and equal to or less than 32). The cell list may be generated per MO that the eNB has instructed the UE to perform measurement thereon, and MO may be a frequency or a RAT.

Figure 11:
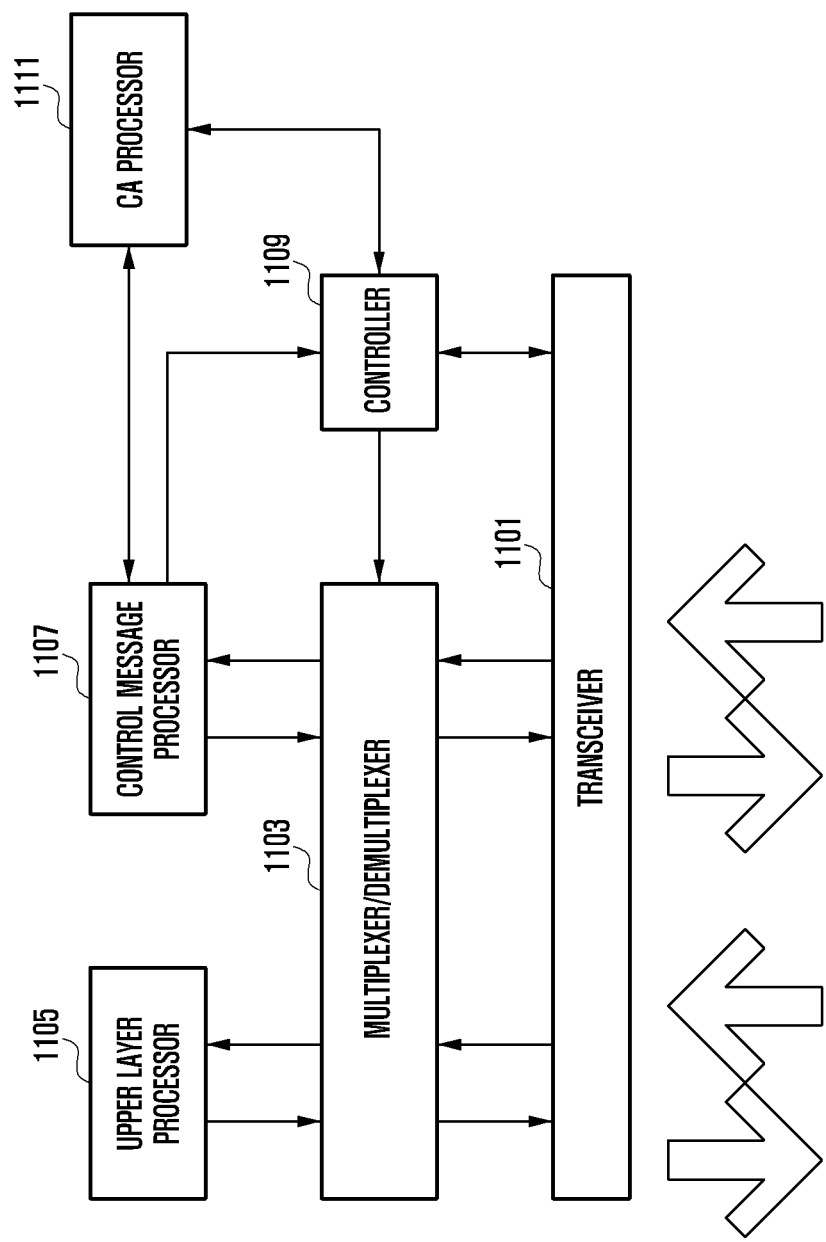
FIG. 11 is a diagram illustrating a configuration of a UE according to an embodiment of the present invention.

FIG. 11 is a diagram illustrating a configuration of a UE according to an embodiment of the present invention. The UE includes a transceiver 1101, a multiplexer/demultiplexer 1103, an upper layer processor 1105, a control message processor 1107, a controller 1109, and a CA processor 1111; in a transmit mode, the UE multiplexes data by means of the multiplexer/demultiplexer 1103 and transmits the multiplexed data by means of the transceiver 1101 under the control of the controller 1109; in a receive mode, the UE receives a physical signal by means of the transceiver 1101, demultiplexes the received signal by means of the multiplexer/demultiplexer 1103, and delivers the demultiplexed data to the upper layer processor 1105 or the control message processor 1107 depending on message information under the control of the controller 1109.

In the present invention, the controller 1109 may control to receive a measurement report command including configuration information related to a cell list generated by an eNB according to whether a second cell to be added in addition to a first cell belongs to a cell group containing the first cell; perform, if it is determined that the second cell belongs to the cell group containing the first cell based on the configuration, measurement on a signal from the second cell; and transmit a second cell measurement report generated based on the measurement result to the eNB. Here, the first cell is a PCell, and the second cell is a SCell.

Figure 12:
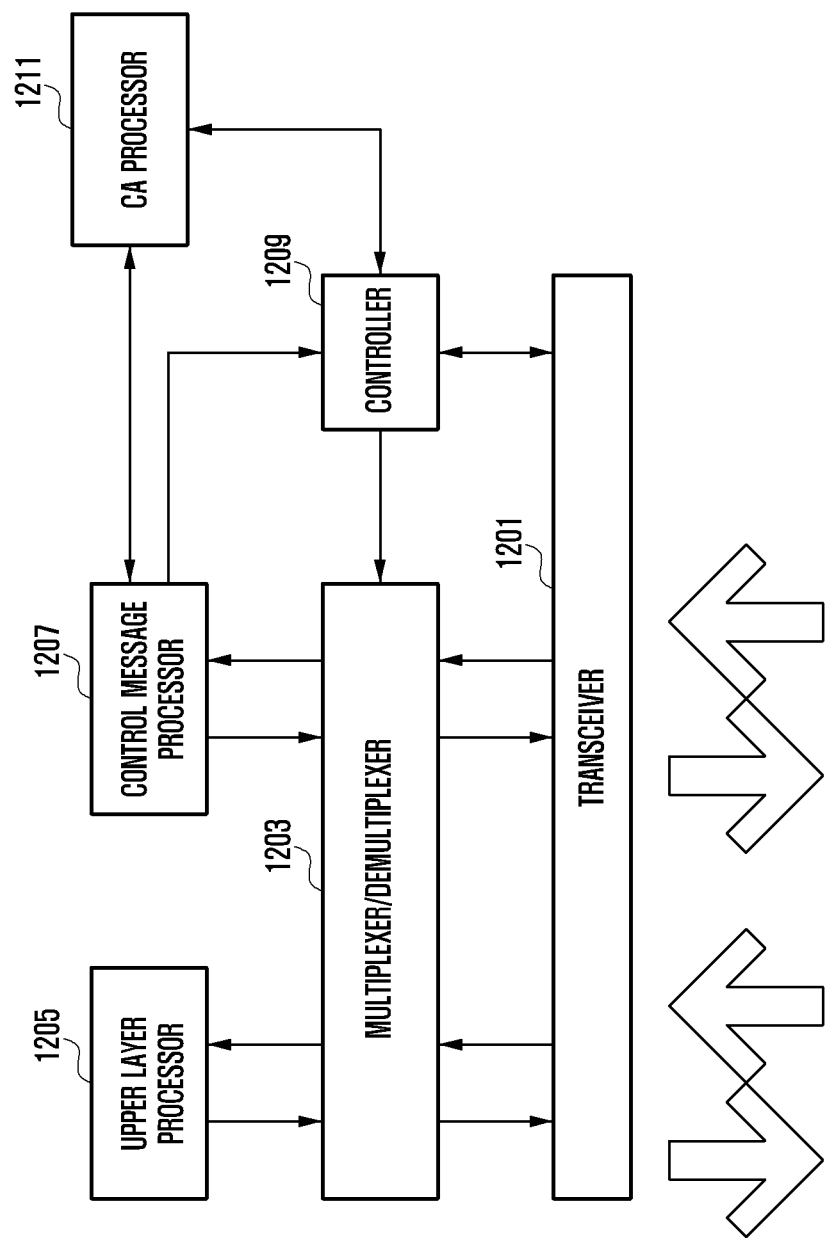
FIG. 12 is a diagram illustrating a configuration of an eNB according to an embodiment of the present invention.

FIG. 12 is a diagram illustrating a configuration of an eNB according to an embodiment of the present invention. The eNB includes a transceiver 1201, a multiplexer/demultiplexer 1203, an upper layer processor 1205, a control message processor 1207, a controller 1209, and a CA processor 1211; in a transmit mode, the UE multiplexes data by means of the multiplexer/demultiplexer 1203 and transmits the multiplexed data by means of the transceiver 1201 under the control of the controller 1209; in a receive mode, the UE receives a physical signal by means of the transceiver 1201, demultiplexes the received signal by means of the multiplexer/demultiplexer 1203, and delivers the demultiplexed data to the upper layer processor 1205 or the control message processor 1207 according to message information under the control of the controller 1209.

In the present invention, the controller 1029 may control to generate a cell list of second cells according to whether a second cell to be added in addition to a first cell belongs to a cell group containing the first cell; transmit a measurement report command including configuration information related to the cell list to a terminal; and receive, if it is determined that the second cell belongs to the cell group containing the first cell based on the configuration information, a second cell measurement report from the terminal. Here, the first cell is a PCell, and the second cell is a SCell.

Although exemplary embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method performed by a base station in a wireless communication system, the method comprising:
   identifying, based on a hardware associated with a primary cell (PCell) in the base station, one or more cells that belong to a same cell group with the PCell serving a terminal, wherein cells of the same cell group are capable of transmitting and receiving traffic via carrier aggregation (CA) with the base station,
   generating a radio resource control (RRC) connection reconfiguration message including a measurement configuration, wherein the measurement configuration includes cell list information for indicating the one or more cells belonging to the same cell group with the PCell;
   transmitting, to the terminal, the RRC connection reconfiguration message including the measurement configuration; and
   receiving, from the terminal, a measurement report for a cell of the one or more cells belonging to the same cell group with the PCell,
   wherein the cell list information instructs the terminal not to transmit a measurement report on a cell different from the one or more cells belonging to the same cell group with the PCell.

2. The method of claim 1, wherein the cell list information includes information on physical cell identity (PCI) for the one or more cells belonging to the same cell group with the PCell.

3. The method of claim 1, wherein the cell list information is generated per measurement object on which the base station instructs the terminal to perform measurement, the measurement object being a frequency or a radio access technology (RAT).

4. The method of claim 1, further comprising:
   configuring a measurement object for triggering a SCell addition operation by adding a second offset to a cell-specific offset of the cell of the one or more cells belonging to the same cell group with the PCell: and
   increasing a threshold for the following triggering condition associated with the SCell addition operation:
   Mn+Ofn+Ocn−Hvs >Thresh, where Mn refers to a measurement result of a neighboring cell, Ofn refers to a frequency specific offset of a neighboring cell, Ocn refers to a cell-specific offset of the neighboring cell, and Thresh refers to the increased threshold.

5. The method of claim 1, further comprising:
   configuring a measurement object for triggering a SCell change operation by adding a cell-specific offset of the cell of the one or more cells belonging to the same cell group with the PCell; and
   increasing an offset value for the following triggering condition associated with the SCell change operation:
   Mn+Ocn−Hvs >Ms+Ocs+Off, where Mn refers to a measurement result of a neighboring cell, Ofn refers to a frequency specific offset of the a neighboring cell, Ocn refers to a cell-specific offset of the neighboring cell, Ms refers to a measurement result of a serving cell, Ocs refers to a cell-specific offset of the serving cell, and Off refers to the increased offset value.

6. The method of claim 1, wherein the measurement configuration includes black list information on at least one cell that does not belong to the same cell group with the PCell.

7. The method of claim 6, wherein the information on the at least one cell that does not belong to the same cell group with the PCell comprises a ranking index, a physical cell ID (PCID), an average time while the at least one cell that does not belong to the same cell group with the PCell is not contained in the cell list information, a number of measurement reports while the at least one cell that does not belong to the same cell group with the PCell is not contained in the cell list information, and a time while the at least one cell that does not belong to the same cell group with the PCell is not contained in the cell list information, the average time being determined based on the number of measurement reports and the time, and the ranking index being set based on the average time.

8. The method of claim 1, further comprising:
comparing an average time while one cell that does not belong to the same cell group with the PCell is not contained in the cell list information, with a preconfigured configuration value; and
replacing another cell in the cell list information with the one cell that does not belong to the same cell group with the PCell based on a comparison result.

9. The method of claim 1, wherein the one or more cells belonging to the same cell group with the PCell are pre-registered in the base station.

10. The method of claim 1, wherein the hardware associated with the PCell comprises at least one of a signal processor, a channel card, or inter-cell traffic switch.

11. A measurement report transmission method of a terminal in a wireless communication system, the method comprising:
receiving, from a base station, a radio resource control (RRC) connection reconfiguration message including a measurement configuration, wherein the measurement configuration includes cell list information for indicating one or more cells belonging to a same cell group with a primary cell (PCell) serving the terminal, wherein the one or more cells are related to a hardware associated with the PCell in the base station and cells of the same cell group are capable of transmitting and receiving traffic via carrier aggregation (CA) with the base station;
controlling to not transmit a measurement report on a cell different from the one or more cells belonging to the same cell group with the PCell,
performing measurement on a cell of the one or more cells belonging to the same cell group with the PCell; and
transmitting, to the base station, a measurement report based on the measurement of the cell of the one or more cells belonging to the same cell group with the Pcell.

12. The method of claim 11, wherein the measurement configuration includes black list information on at least one cell that does not belong to the same cell group with the PCell.

13. A base station for receiving a measurement report in a wireless communication system, the base station comprising:
a transceiver configured to communicate signals with a terminal; and
a controller configured to:

identify, based on a hardware associated with a primary cell (PCell) in the base station, one or more cells that belong to a same cell group with the PCell serving a terminal wherein cells of the same cell group are capable of transmitting and receiving traffic via carrier aggregation (CA) with the base station,
generate a radio resource control (RRC) connection reconfiguration message including a measurement configuration, wherein the measurement configuration includes cell list information for indicating the one or more cells belonging to the same cell group with the PCell,
control the transceiver to transmit, to the terminal, the RRC connection reconfiguration message including the measurement configuration, and
control the transceiver to receive a measurement report for a cell of the one or more cells belonging to the same cell group with the PCell from the terminal,
wherein the cell list information instructs the terminal not to transmit a measurement report on a cell different from the one or more cells belonging to the same cell group with the PCell.

14. A terminal for transmitting a measurement report in a wireless communication system, the terminal comprising:
a transceiver configured to communicate signals with a base station; and
a controller configured to:
control the transceiver to receive, from the base station, a radio resource control (RRC) connection reconfiguration message including a measurement configuration, wherein the measurement configuration includes cell list information for indicating one or more cells belonging to a same cell group with a primary cell (PCell) serving the terminal, wherein the one or more cells are related to a hardware associated with the PCell in the base station and cells of the same cell group are capable of transmitting and receiving traffic via carrier aggregation (CA) with the base station,
control to not transmit a measurement report on a cell different from the one or more cells belonging to the same cell group with the PCell,
perform measurement on a cell of the one or more cells belonging to the same cell group with the PCell, and
transmit, to the base station, a measurement report, based on the measurement, for the cell of the one or more cells belonging to the same cell group with the PCell.

* * * * *